US007756929B1

(12) United States Patent
Pettigrew et al.

(10) Patent No.: US 7,756,929 B1
(45) Date of Patent: Jul. 13, 2010

(54) SYSTEM AND METHOD FOR PROCESSING E-MAIL

(75) Inventors: Nancy Pettigrew, Lomita, CA (US); Amit Jhawar, Los Angeles, CA (US); Shashank Kavishwar, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 1707 days.

(21) Appl. No.: 10/849,090

(22) Filed: May 18, 2004

(51) Int. Cl.
*G06F 15/16* (2006.01)
*G06F 15/173* (2006.01)
(52) U.S. Cl. .................. 709/206; 709/223; 709/224
(58) Field of Classification Search ................ 709/204, 709/206, 207, 223–225
See application file for complete search history.

(56) References Cited

U.S. PATENT DOCUMENTS

| | | | |
|---|---|---|---|
| 6,057,841 A * | 5/2000 | Thurlow et al. ............. | 715/809 |
| 6,421,709 B1 | 7/2002 | McCormick | |
| 6,654,787 B1 * | 11/2003 | Aronson et al. ............. | 709/206 |
| 6,757,830 B1 * | 6/2004 | Tarbotton et al. ........... | 713/188 |
| 6,779,021 B1 * | 8/2004 | Bates et al. ................. | 709/206 |
| 6,898,715 B1 * | 5/2005 | Smithson et al. ............. | 726/24 |
| 6,941,348 B2 * | 9/2005 | Petry et al. .................. | 709/206 |
| 7,027,463 B2 * | 4/2006 | Mathew et al. .............. | 370/463 |
| 7,171,450 B2 | 1/2007 | Wallace | |

\* cited by examiner

*Primary Examiner*—Hussein A Elchanti

(57) ABSTRACT

The present invention provides an improved system and method for processing e-mail. The system may be implemented over a distributed network having several redundant mail servers. The system may include a message switch that receives all incoming e-mail messages and includes a policy filter, a content filter, a virus filter and a spam filter. The filters process the message in a sequential order and can be dynamically reconfigured to adapt to certain conditions. The message is stored in an area of the message switch and the filters communicate with each other by passing links to the message in order to reduce input/output. This communication method may be altered to suit the installation of the software, without altering each filter. Messages that do not pass the filters may be rejected or placed in a quarantine area. Messages that pass all of the filters are delivered to their intended recipients.

33 Claims, 7 Drawing Sheets

SYSTEM AND METHOD FOR PROCESSING E-MAIL

FIELD OF THE INVENTION

The present invention generally relates to a system and method for processing e-mail and more particularly, to a system and method that receives e-mail messages and filters the messages for policy and content violations, viruses and spam before directing the messages to the intended recipients.

BACKGROUND OF THE INVENTION

In order to properly manage e-mail, enterprises are typically required to implement various hardware and/or software solutions. Namely, enterprises typically employ various devices to filter e-mail content and policy enforcement, to protect against e-mail viruses, and to filter and remove spam e-mail.

E-mail has become a key method of communication in most enterprises. While a great productivity and communication tool, e-mail opens enterprises to certain risks and necessitates oversight and monitoring to ensure security and efficiency. For example, when electronic documents are sent outside the company, e-mail heightens the risk of disclosing proprietary information or a confidentiality breach, resulting in potential legal liabilities.

Further, specific laws govern communication in various industries, including financial services and healthcare. For example, NASD rule 3110 requires companies in the investment banking and securities business to monitor all e-mail communications for compliance. Even when there is no regulatory concern, policy enforcement of inbound and outbound communication makes good business sense. Therefore, companies must employ systems and methods of policy management and enforcement relative to their e-mail traffic.

Moreover, unsolicited mass e-mail or "spam" has become a serious problem for all Internet users. A user can receive tens of hundreds of spam messages in a given day. Some companies specialize in creating distribution lists that allow senders of spam or "spammers" to easily reach millions of undesiring recipients with advertisements and solicitations. Spam has thus evolved from simply being a nuisance to become a significant problem, especially for businesses. Spam affects employees' productivity, it introduces potential legal liability, and there are real costs to the recipients and their corporations. As a result, enterprises are also required to provide and maintain systems for filtering and removing spam e-mail.

With e-mail becoming ubiquitous in corporate environments and elsewhere, viruses and other harmful files have the ability to spread at lightning speed. Some estimate that today viruses, worms, and Trojan horses can spread and propagate at a rate of tens of thousands of copies per hour. At this rate, there is little time to update desktop and gateway anti-virus systems to ensure corporate networks and systems are protected. Thus, enterprises also employ systems for filtering viruses from e-mail traffic.

Providing and maintaining numerous separate and independent solutions for processing e-mail can be complex, costly and difficult. Therefore, it would be desirable to provide a system for processing e-mail that can integrate policy enforcement, content filtering, virus protection and spam filtering in a single system.

SUMMARY OF THE INVENTION

The present invention provides an improved system and method for processing e-mail. In one aspect, the invention combines policy enforcement, content filtering, virus protection and spam filtering into a single integrated system. The system may be implemented over a distributed network having several redundant mail servers. The system may include a message switch that receives all incoming e-mail messages and includes a policy filter, a content filter, a virus filter and a spam filter. The filters process the message in a sequential order and can be dynamically reconfigured to adapt to certain conditions. The message is stored in an area of the message switch and the filters communicate with each other by passing links to the message in order to reduce input/output. Communication between the filters may be altered to suit the installation without altering any of the filters themselves. Messages that do not pass the filters may be rejected or placed in a quarantine area. Messages that pass all of the filters are delivered to their intended recipients. Additional filter modules may be added at will, such as archival and security modules.

According to one aspect of the present invention, a system for processing e-mail messages for a plurality of clients is provided. The system includes a database for storing rules and settings for the plurality of clients, including policy rules, content rules and spam rules; and a message switch that loads rules and settings from the database for a message, based on a client associated with the message, and that includes a policy filter, a content filter and a spam filter that respectively filter the message according to the policy rules, content rules, and spam rules for the client.

According to another aspect of the present invention, a system for processing e-mail is provided. The system includes a policy filter that loads policy rules for a message from the database, based on a client associated with the message, compares the message to the policy rules, and blocks the message if a policy rule is violated, or accepts the message if it passes certain policy rules, skipping further filters; a content filter that loads content rules for a message from the database, based on a client associated with the message, compares the message to the content rules, and blocks the message if a content rule is violated; a virus filter that detects malicious code and blocks the message if malicious code is detected; and a spam filter that loads spam rules for a message from the database, based on a client associated with the message, determines whether the message is spam based on the rules, and that blocks the message; wherein the filters process the message in a predetermined order, which is dynamically configurable, based on current conditions.

According to another aspect of the invention, a method for processing e-mail messages is provided. The method includes providing a first filter, a second filter, and a third filter; receiving messages for processing; processing the messages through the filters in a predetermined order; monitoring current conditions; and selectively and dynamically modifying the predetermined order based on current conditions.

These and other features and advantages of the invention will become apparent by reference to the following specification and by reference to the following drawings.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention can be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

The present invention provides a system and method for processing e-mail. Particularly, the invention integrates policy enforcement and content filtering, virus protection and spam filtering in a single system. The term "spam" can be understood to include one or more unsolicited electronic messages, sent or posted as part of a larger collection of messages, all having substantially identical content.

Figure 1:
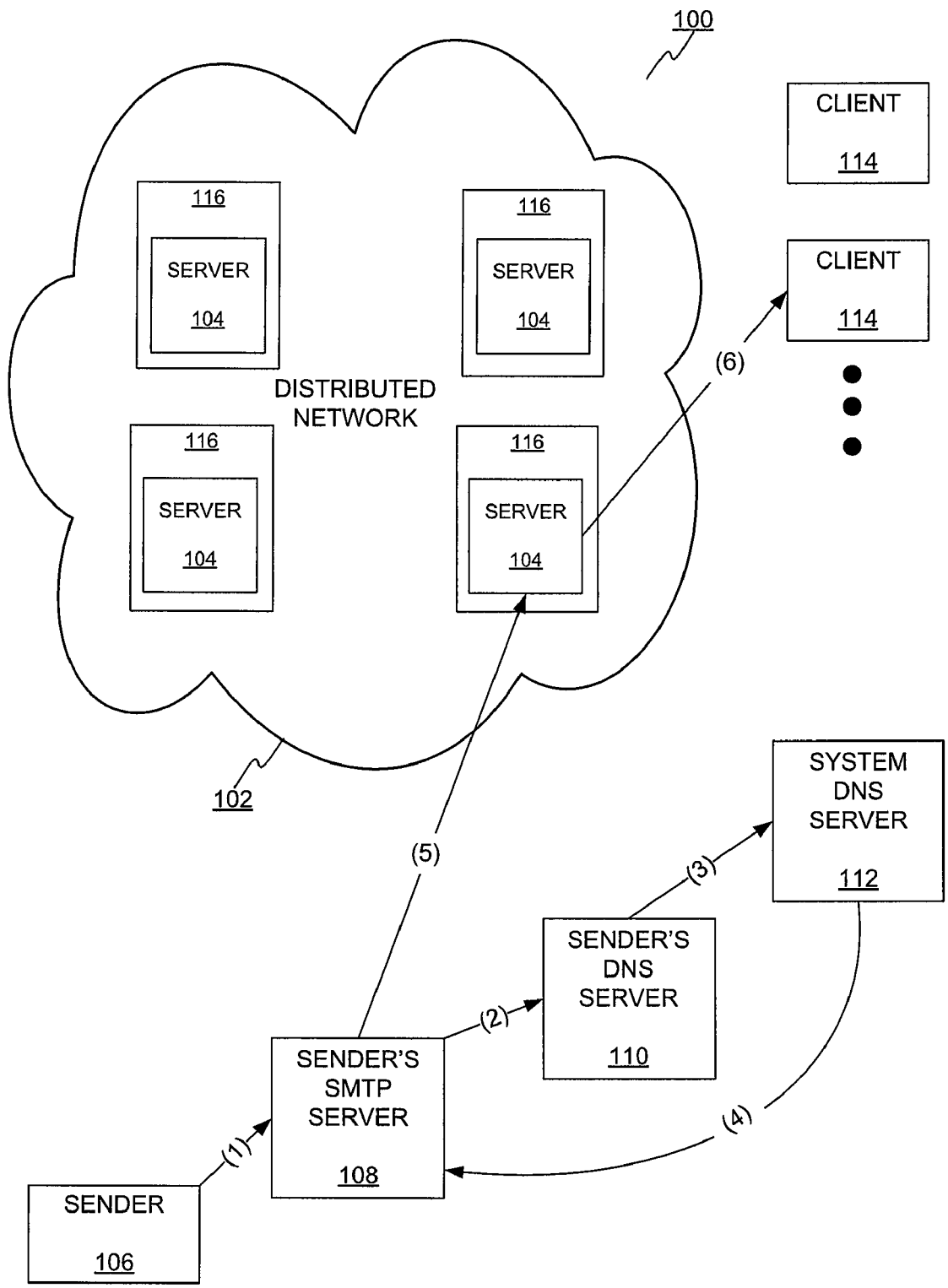
FIG. 1 is a schematic diagram illustrating a system for processing e-mail according to the present invention, implemented over a distributed network.

FIG. 1 illustrates a system 100 for processing e-mail, according to the present invention. In the preferred embodiment, the system 100 is implemented over a distributed network 102 and is effective to screen, filter and disinfect e-mail prior to delivering it to its intended recipients. The distributed network 102 includes multiple conventional servers 104, which are communicatively interconnected. Several remote and secure data centers 116 house servers 104. The data centers 116 are physically constructed to withstand substantial meteorological and geological events, and include state of the art security measures, climate control systems, built-in redundancies and back-up generators to ensure high availability and reliability. The data centers 116 are preferably dispersed in remote locations throughout a geographic coverage region. A system operator may control operation of the system 100, and signup multiple remotely located customers or "clients" 114 that may be recipients of e-mail. The clients 114 may be remotely located from each other and unrelated. Each different customer or client 114 may represent a single machine or an entire enterprise, including multiple servers. Any e-mail directed to clients 114 will pass through system 100. As will be described in more detail shortly, system 100 will analyze the email traffic and substantially eliminate or reduce viruses, undesirable content, and spam before reaching clients 114. In order to route all e-mail through system 100, each client 114 changes its mail exchanger or "MX" record to reflect the IP address of a conventional DNS server 112 for the system. In this manner, all mail directed to the clients 114 will reach the DNS server 112 for system 100 and be passed through the system 100 prior to reaching clients 114. This process is best shown by a description of steps (1)-(6) depicted in FIG. 1.

When a sender 106 transmits an e-mail message addressed to a client 114, the e-mail passes through system 100 as follows. In step (1), the message passes to a conventional Simple Mail Transfer Protocol (SMTP) server 108 for the sender. In step (2), the SMTP server 108 communicates with a conventional DNS server 110 for the client 106 to request the MX record for the client 114. In step (3), the sender's DNS server 110 makes a record request for the client's MX record, which is now associated with the system's DNS server 112. This request is thus passed to the system's DNS server 112. The system's DNS server 112 then selects the most appropriate data center 116 to service the e-mail. The system's DNS server 112 will select the most appropriate data center 116 based on one or more of the following criteria: (i) the "health" of the servers 104 within the data center 116 (e.g., whether the servers are functioning properly); (ii) the capacity of the servers 104 within the data center 116 (e.g., whether the servers 104 are operating above or below a threshold capacity); (iii) the projected roundtrip time between a remote data center and the intended client 104; and (iv) the geographical distance between the sender 106 and/or the senders DNS server 110 and the data center 116. Different weights can be assigned to the different criteria based on what would be suitable or desirable to a system operator under a given set of circumstances.

In step (4), the system's DNS server 112 responds to the sender's SMTP server 108 with an IP address corresponding to a server 104 in the selected data center 116. In step (5), the SMTP server 108 delivers the message to server 104. Server 104 includes and passes the message through a message processor or "switch", i.e., a software program for policy, content, spam and virus filtering. An instance of the message switch is preferably located and operating within each server 104. The message switch may include one or more programs. If the message switch determines that a message violates content, policy or spam rules or may contain a virus, it may block, reject or quarantine the message. Assuming the message switch does not reject or quarantine the message, server 104 subsequently transmits the message to client 114, as shown in step (6). The configuration and operation of the message switch is discussed in greater detail below in reference to FIG. 3.

Client mail servers are also preferably configured to direct outgoing traffic through the system 100. The IP addresses of client servers are defined on every mail server 104, allowing messages to relay through the network 102.

Figure 2:
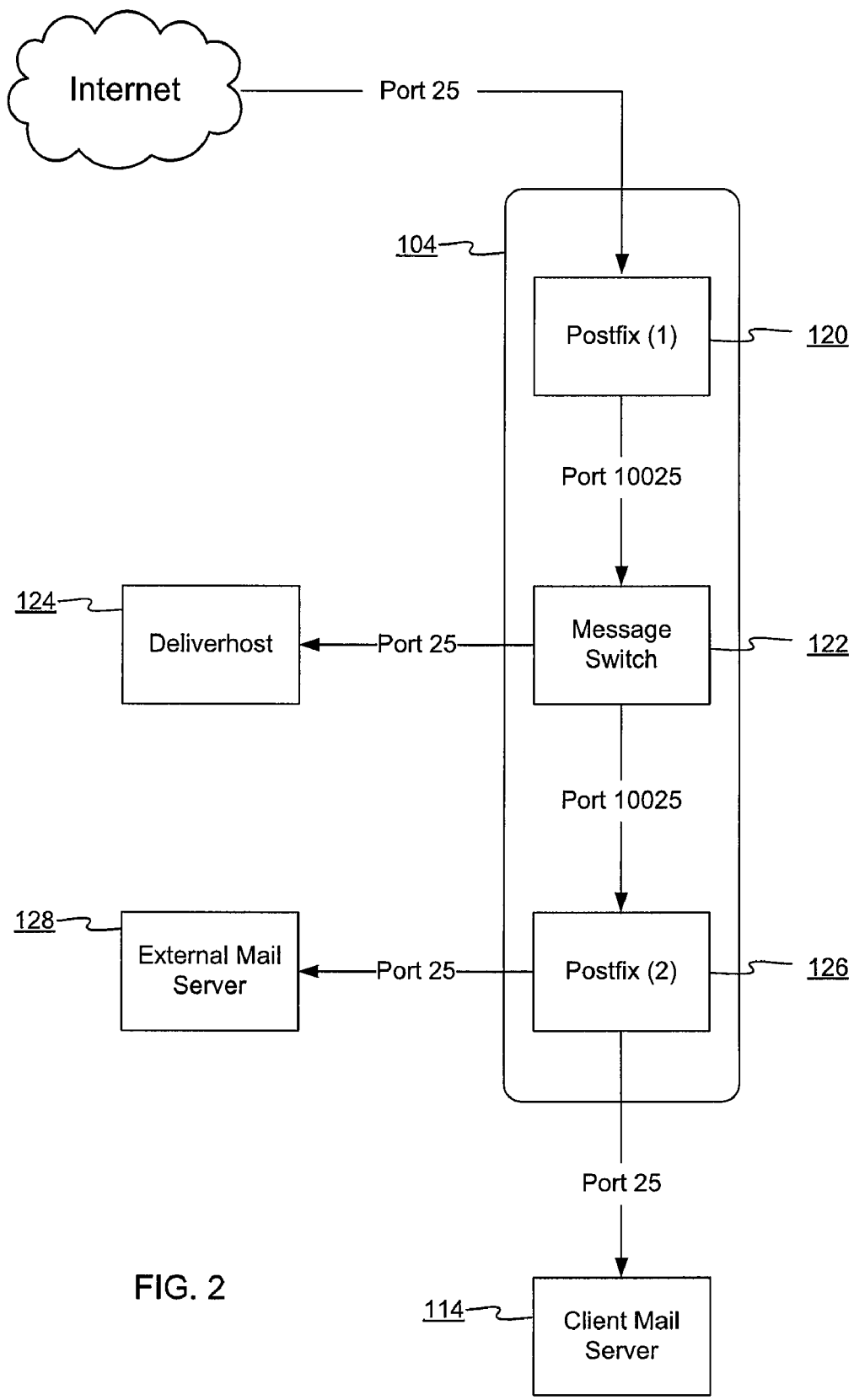
FIG. 2 is a block diagram illustrating the system for processing e-mail according to the present invention, implemented on a mail server.

FIG. 2 is a block diagram illustrating a system 100 for processing e-mail, according to the present invention. While FIG. 2 will be primarily described in relation to a system and its components, it should be appreciated that each of the portions or blocks illustrated in FIG. 2 (as well as the portions or blocks illustrated in the other Figures) may represent logic steps or processes and/or the hardware and/or software utilized to perform the logic steps or processes. It should further be appreciated that the processes of any one or more of the portions or blocks shown can be implemented in a computer readable medium for controlling the operation of a computer.

The system 100 may include multiple instances, each running on a mail server 104. The system includes a first "Postfix" module 120 that monitors port 25 for incoming messages. In one embodiment, module 120 is preferably an open source mail transfer agent (MTA) that implements SMTP. Although the current embodiment uses Postfix, in alternate embodiments, any suitable MTA could be used. When a connection is made to port 25, the module 120 determines whether to accept the message (e.g., whether the message is addressed its mail server). A client's outgoing messages are received by the message switch as follows. The client points all traffic from the system. Messages directed through the system in this manner are processed in the same manner as incoming messages. The system determines the outgoing status of the messages by the originating IP address and the sender of the message.

The Postfix module 120 communicates messages that it accepts to message switch 122. The message switch 122 then performs policy, content, virus and spam filtering. If the message is determined to be spam, the message switch 122 may transfer the message to a local delivery agent 124. The local delivery agent 124 delivers the message to a predetermined location or spam mailbox (e.g., a Spam Shark™ site or mailbox), where clients can enter and review messages addressed to them that were designated as spam. If the message is determined to violate policy or content rules or contain a virus, the message may be cleaned and sent out or rejected (e.g., with a notification to the sender and/or intended recipient).

If the message switch 122 determines that the message is acceptable (i.e., does not contain spam, a virus or content/policy violations), the message switch 122 communicates the message to a second Postfix module 126 over port (e.g., over port 10026). The second postfix module 126 then forwards the e-mail message to its intended recipient(s), which may be located at a customer or client mail server 114, or a non-customer external mail server 128. In one embodiment, the second Postfix module 126 may be used to deliver rejected messages back to their respective senders.

Figure 3:
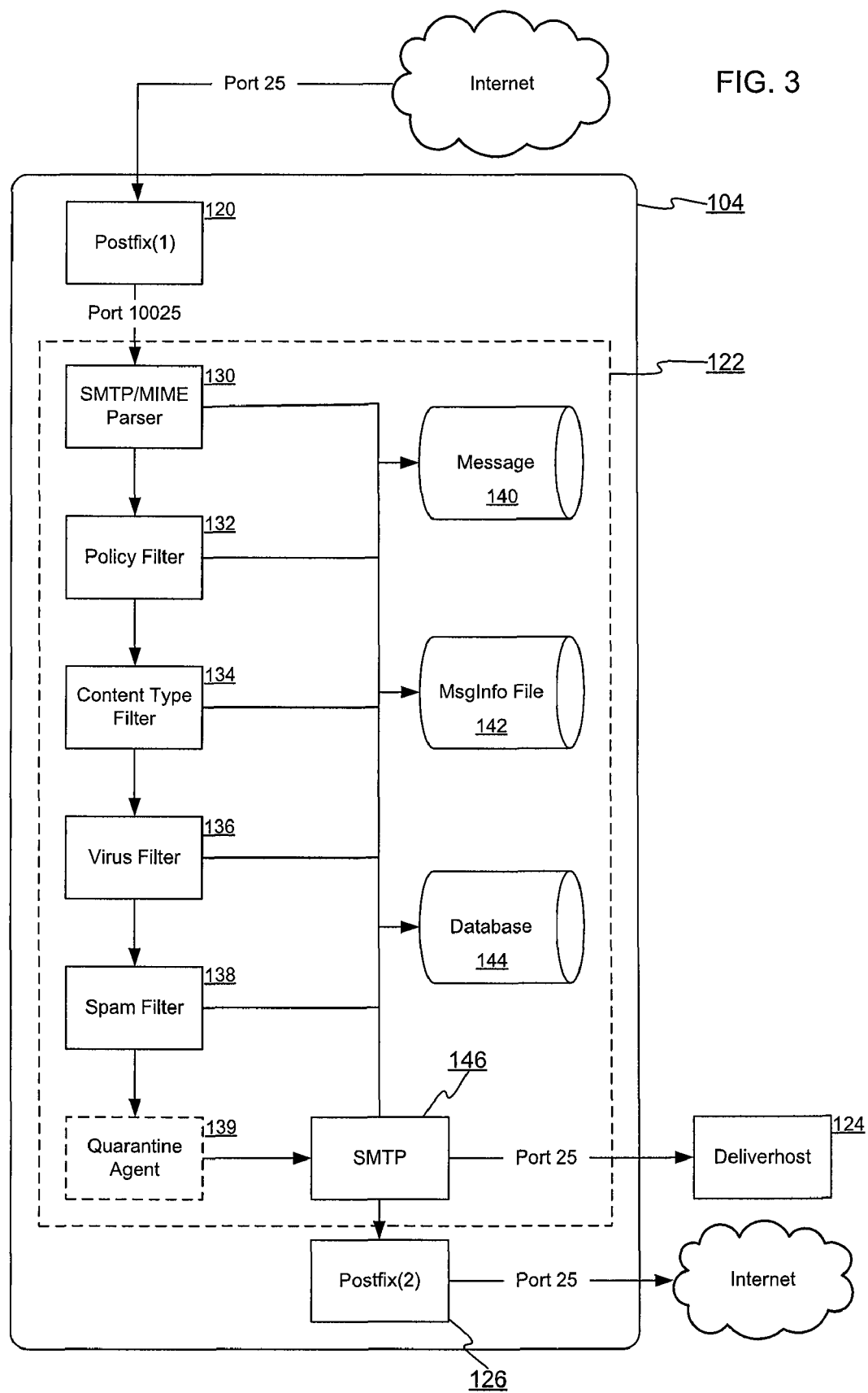
FIG. 3 is a block diagram illustrating the components of a message switch utilized by the system for processing e-mail shown in FIG. 2.

FIG. 3 illustrates the components of the message switch 122. In one embodiment, message switch 122 includes the following components: an SMTP/MIME parsing module 130, a policy filter 132, a content filter 134, a virus filter 136, a spam filter 138 and an SMTP delivery module 146. In one embodiment, the system may also include a quarantine agent 139 that provides notifications for messages flagged for quarantine by any of the filters. The quarantine agent 139 may run after all of the filters and before message delivery. In alternate embodiments, the message switch 122 may include fewer, additional and/or different components and filters. The filters 132, 134, 136 and 138 are communicatively coupled to a settings database 144. When the message switch 122 receives the message it may store the message as a message file 140, which may include a header file and all parts (e.g., attachments and body) of the message. The message switch 122 will create symbolic links ("soft links") to the parts of the message file to reduce the amount of input/output the filters perform. Specifically, the symbolic links are used to redirect the filters 132-138 to the message file for processing. As the filters 132-138 process the message, they update a "MsgInfo" file 142 for the message with the filter results for the message (i.e., whether the message passed the filter). The message switch 122 creates a MsgInfo file 142 for each message. The MsgInfo file 142 is preferably a text file that contains attribute information about the message such as a message ID number, queue directory, SMTP conversation information, recipient details and information regarding each part of the message. The settings database 144 is preferably a relational database containing rules and settings associated with each of the various clients of the system. For example, the settings database 144 may include a list of filters that are enabled for a particular client (or "opted out" by a client); a list of rules selected by the client for each of the enabled filters; and settings, values and attributes of the rules. When the message switch 122 receives mail directed to or from a client 114, each of the filters 132-138 can access the database 144 to load the rules and settings assigned to that client. The SMTP delivery module 146 directs messages to the local delivery box 124 or to the second postfix module 126.

In the preferred embodiment, the SMTP/MIME parsing module 130 is a conventional parsing program that receives messages from the first postfix module 120 and parses the messages into their respective parts (e.g., header, main body, and attachments). After processing the message, the parsing module 130 will create a link to the message and communicate the link to the policy filter 132. In the preferred embodiment, the filters 132-138 process the message in sequential order. If a message "passes" a filter, it will continue on to the next. Communication between filters is accomplished by user of the MsgInfo file, and soft links to the actual message being processed. When a filter finishes processing a message, it places a link to that message in the next filter's queue. The next filter is constantly monitoring its queue for messages to process.

If the message fails any of the filters, it is automatically rejected, deleted or placed into quarantine. In the preferred embodiment, the system can automatically and dynamically configure the message switch 122 to rearrange the order in which the message passes through the filters 132-138, based on current conditions in order to improve efficiency of overall the filtering process. The current conditions may be monitored by the system or a system operator. For example, if the system detects a widespread virus attack, the message switch 122 may arrange the order so that each e-mail message first passes through the virus filter 136. This way the system will decrease the total amount of processing required, because a large number of messages will be eliminated immediately by the virus filter 136 and avoid the unnecessary processing by the remaining filters. In another example, the system or a system operator may detect a large scale spam attack during a certain time frame. In response, the message switch 122 may rearrange the filters to first pass messages through the spam filter 138, thereby decreasing the overall processing to remove a large number of spam messages. The filters may be rearranged to their original order once the spam attack is over. Thus, the ability to dynamically reconfigure the filter ordering gives the system flexibility to efficiently adapt to various conditions and attack situations. In some embodiments, the order of the filters can be manually reconfigured by a system operator as well as automatically reconfigured by the system.

Figure 4:
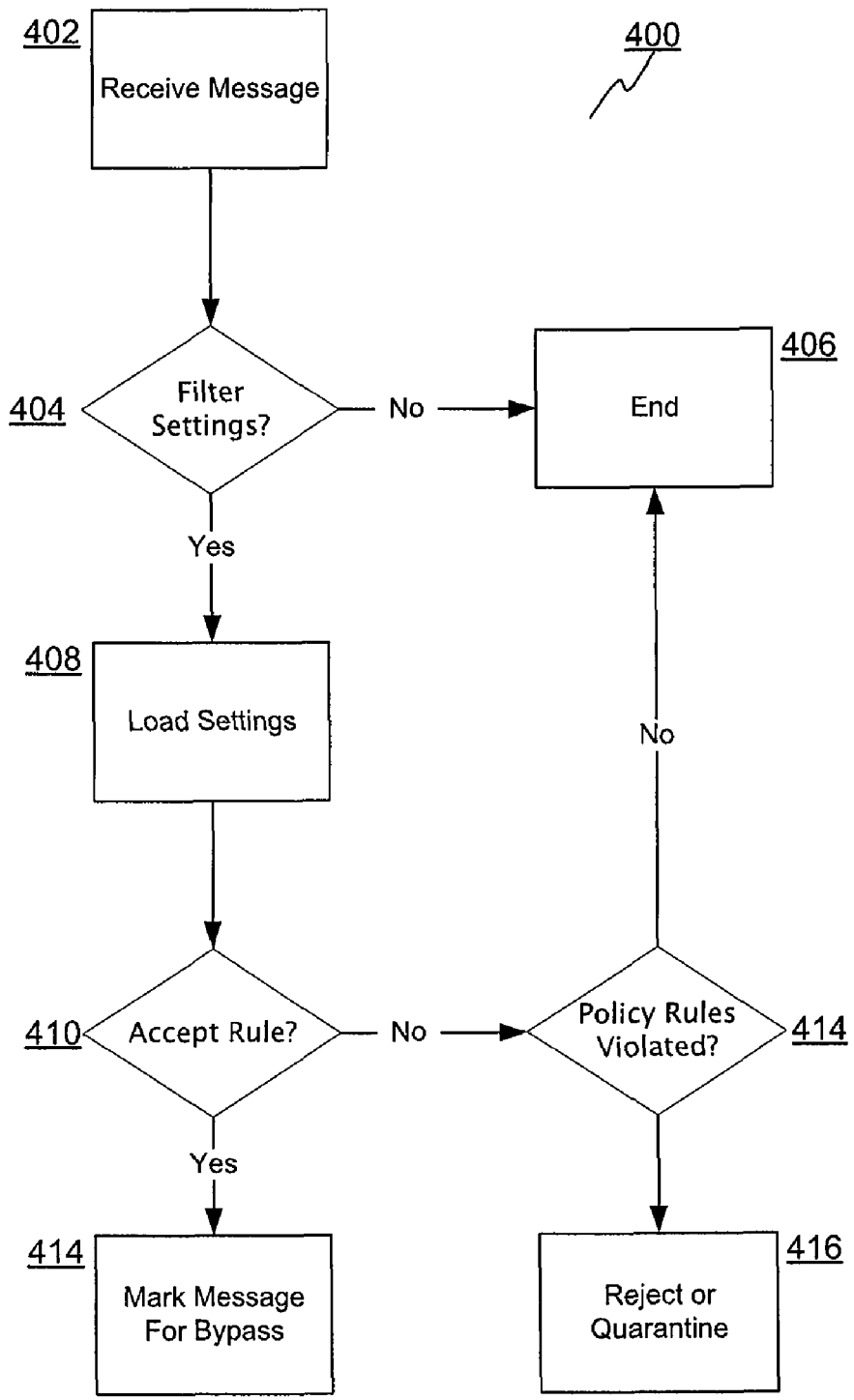
FIG. 4 is a flow diagram illustrating a method used by a policy filter of the message switch to process messages according to policy type rules.

The policy filter 132 is communicatively coupled to the parsing module 130 and to the content filter 134. The policy filter 132 rejects or quarantines messages if they match "reject" or "quarantine" type rules. It also marks messages that match "accept" type rules, so that the message can bypass the other filters and other "reject" or "quarantine" type policy rules. FIG. 4 illustrates an example of a method 400 performed by the policy filter 132 to review incoming messages. In alternate embodiments, these steps may be performed in any order and may include additional or fewer steps. In step 402, the policy filter 132 receives a message (e.g., a link from the parsing module 130) and determines the inbound/outbound status of message. In step 404, the filter 132 determines whether any settings exist for the pertinent client domains (e.g., the incoming or outgoing domains) in the database 144. If no settings exist for the associated client, the policy filter 132 ends the process in step 406 and provides a link to the message to the content filter 134. In one embodiment, a system operator or user can also selectively opt out of the filter by accessing database 144 and storing/modifying a corresponding notification in the database 144. In such an embodiment, the policy filter 132 may also check if an "opt out" notification is present for the client and if so, end the process. In step 408, the policy filter 132 caches all relevant settings and rules for the domains pertinent to the message (i.e., for the relevant incoming or outgoing clients). In step 410, the filter 132 determines if any "accept" rules apply to the message. An "accept" rule is a rule that will allow a message to bypass one or more of the filters 132-138 and other policy rules. For example, an enterprise may wish to accept all messages originating from and/or destined to a particular individual or group of individuals. If the policy filter 132 detects that the accept rule applies to the message, it marks the message with an "accept" tag, which may be stored in the MsgInfo file 142 and causes it to bypass the remainder of the policy filter 132, as shown in step 412. All subsequent filters will detect the "accept" tag in the MsgInfo file 142 and will pass the message directly to SMTP block 146 without additional filtering. In one embodiment, all messages will pass through the virus filter 136, even if an "accept" tag has been attached to the message.

If the message does not trigger an "accept" rule, the policy filter 132 proceeds to step 414 and checks all parts of the message against the relevant settings and policy rules. These rules may include, for example, a maximum recipient number rule (e.g., the message cannot be addressed to more than a predetermined number of individuals), maximum size rules (e.g., the message and/or attachments cannot exceed a predetermined size), and other policy rules. Other policy rule examples may include instructions to block all messages coming from a particular domain, and to block messages with certain text in the subject and body. If a message does not match any rule, the policy filter 132 ends the process in step 406 and provides a link to the message to the content filter 134. If a message matches a policy rule it will be rejected or quarantined, as shown in step 416. In the preferred embodiment, each of the policy rules may be designated as a "reject" or "quarantine" type rule. If a message matches a "reject" rule, the policy filter 132 will return the message back to its sender with an indication that the message could not be delivered for violation of a policy rule. A similar indication may also be sent to the intended recipient. If a message matches a "quarantine" type rule, the policy filter 132 may store the message in a "quarantine" area. If the policy filter 132 quarantines a message, the message switch 122 may provide a notification to the designated recipient and/or sender that the message has violated a policy rule and has been placed in quarantine. If the policy filter 132 rejects or quarantines a message, the message switch 122 does not perform any additional filtering of the message (e.g., a notation that the message failed the filter is stored in the MsgInfo file 142 and the remaining filters are bypassed). In one embodiment, accept rules take precedence over reject rules, which take precedence over quarantine rules.

Figure 5:
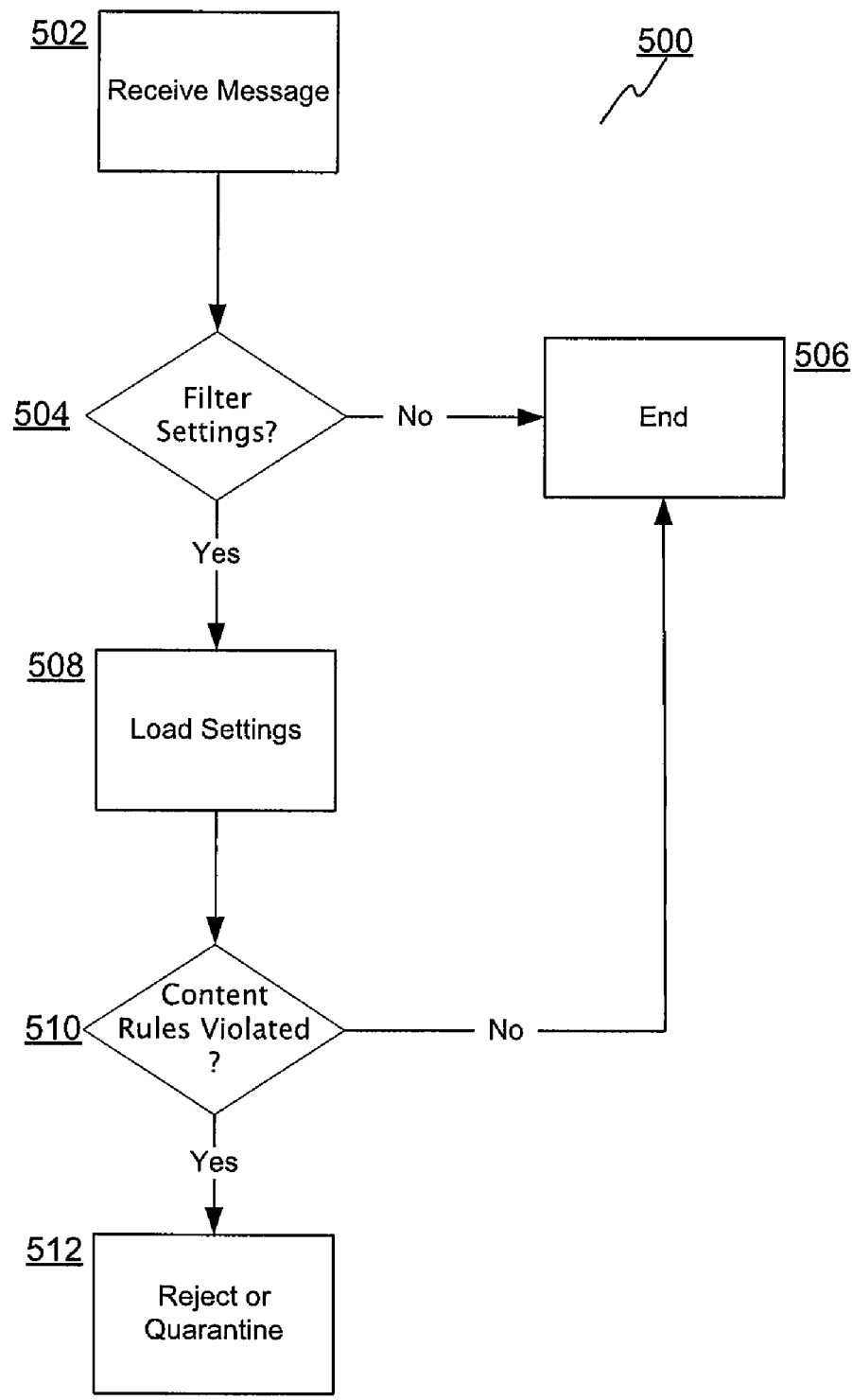
FIG. 5 is a flow diagram illustrating a method used by a content filter of the message switch to process messages according to content type rules.

The content filter 134 is communicatively coupled to the policy filter 132 and the virus filter 136. The content filter 134 receives links to messages that have passed through the policy filter 132 in a queue. As soon as the content filter 134 detects a link in its queue, it selects the corresponding message for processing. FIG. 5 illustrates an example of a method 500 performed by the content filter 134 to process incoming messages. In alternate embodiments, these steps may be performed in any order and may include additional or fewer steps. In step 502, the content filter 134 receives a message and determines the inbound/outbound status of message. In step 504, the filter 134 determines whether any settings exist for the pertinent domains (e.g., the incoming or outgoing domains) in the database 144. If no settings exist for the associated client, the content filter 134 ends the process in step 506 and provides a link to the message to the virus filter 136. In one embodiment, a system operator or user can also selectively opt out of the content filter 134 by accessing database 144. In such an embodiment, the content filter 134 may also check if an "opt out" notification is present for the client and if so, end the process. In step 504, the content filter 134 may also review the MsgInfo file 142 to determine whether the message has failed a previous filter. If the message has failed a previous filter, the message will bypass the filter and the process ends in step 506. In an alternate embodiment, the message may also bypass the content filter 134 if an accept rule applies. In step 508, the content filter 134 caches all relevant settings and rules for the domains pertinent to the message from the database 144. In step 510, the filter 134 checks all parts of the message against the relevant content settings and rules. These rules may include, for example, prohibitions of types of file attachments (e.g., the message cannot include files with .exe and/or other types of extensions), prohibitions against types of character sets, prohibitions on certain filenames, prohibition of partial messages, and other content type rules. If a message does not match any rule, the content filter 134 ends the process in step 506 and provides a link to the message to the virus filter 136. In the preferred embodiment, if a message matches a rule it will be rejected or quarantined, as shown in step 512. Each of the content rules is designated as a "reject" or "quarantine" type rule. If a message matches a "reject" rule, the content filter 134 will return the message back to its sender with an indication that the message could not be delivered. An indication may also be sent to the intended recipient. If a message matches a "quarantine" type rule, the content filter 134 may store the message in a "quarantine" area. If the content filter 134 quarantines a message, the message switch 122 may provide a notification to the designated recipient and/or sender that the message has violated a policy rule and has been placed in quarantine. If the content filter 134 rejects or quarantines a message, the message switch 122 does not perform any additional filtering of the message (i.e., the remaining filters are bypassed).

Figure 6:
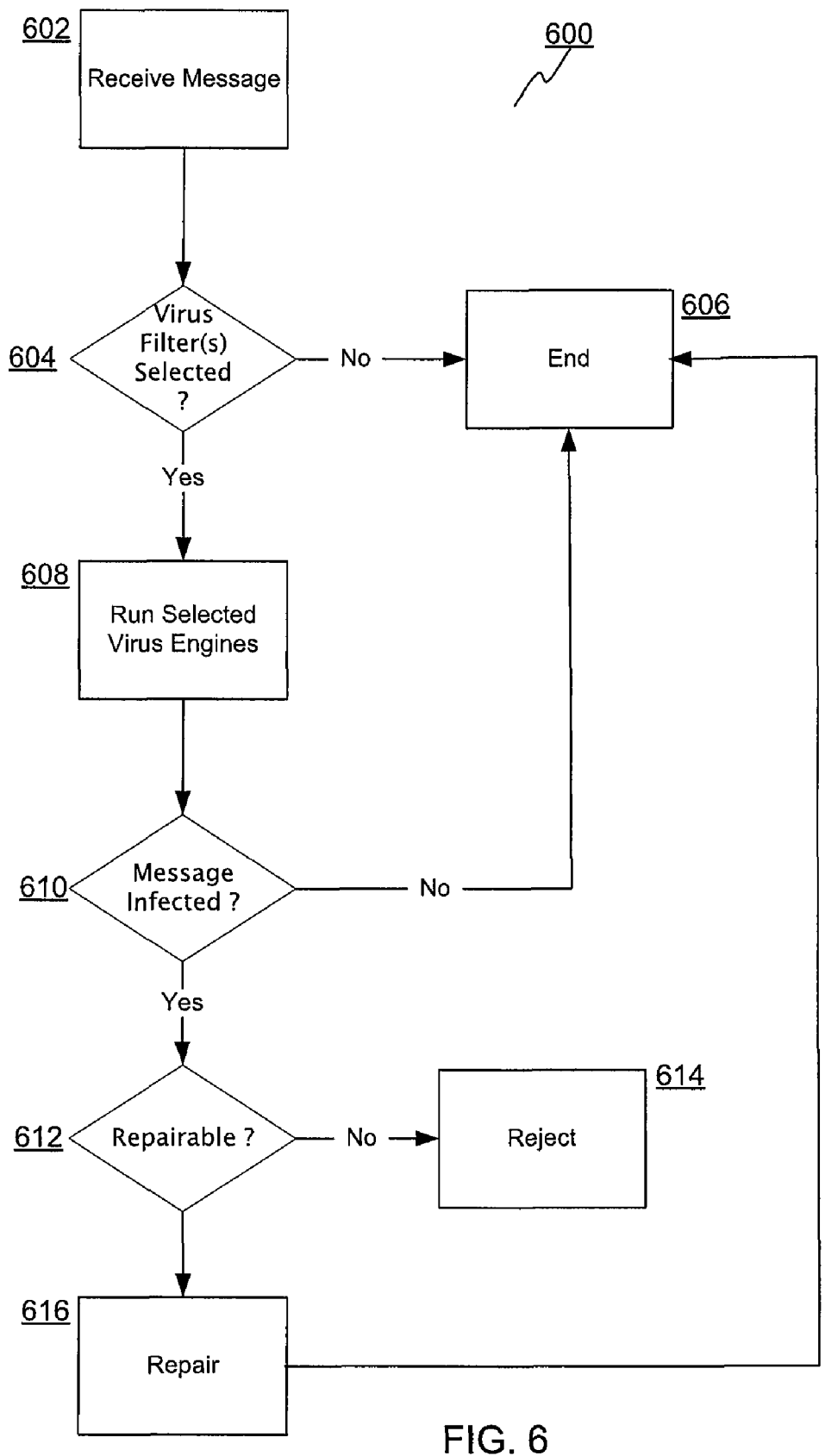
FIG. 6 is a flow diagram illustrating a method used by a virus filter of the message switch to process messages.

The virus filter 136 is communicatively coupled to the content filter 134 and the spam filter 138. In the preferred embodiment, the virus filter 136 includes several different virus filtering engines. Each client may select to use any one or more of the engines to scan for viruses. The client's selections are stored in database 144. In one embodiment, the virus-scanning engines include Sophos™, Symantec™, and Trend™. The virus-scanning engines examine the attachments on messages and html parts of messages for malicious code and viruses. The virus filter 136 receives links to messages that have passed through the content filter 134 in a queue. As soon as the virus filter 136 detects a link in its queue, it selects the corresponding message for processing. In one embodiment, the virus filter 136 only processes incoming messages. FIG. 6 illustrates an example of a method 600 that the virus filter 136 performs to process incoming messages. In alternate embodiments, the virus filter may perform these steps in any order and may include additional or fewer steps. In step 602, the virus filter 136 receives a message and determines the inbound/outbound status of message. In step 604, the filter 136 determines whether any virus-scanning engines have been selected or enabled for the pertinent domain (e.g., the incoming domain) in the database 144. The system may perform outbound virus scanning for those clients with outbound services. If no virus-scanning engines have been enabled by the associated client, the virus filter 136 ends the process in step 606 and provides a link to the message to the spam filter 138. In step 604, the virus filter 136 may also review the MsgInfo file 142 to determine whether the message has failed a previous filter. In one embodiment, accept rules will not cause a message to skip the virus filter. That is, for safety, messages will always pass through the virus filter. In an alternate embodiment, a message may bypass the virus filter 136 if an accept rule applies. If the message has failed a previous filter, the message will bypass the filter and the process ends in step 606. In step 608, the virus filter 136 runs all parts of the message through all selected virus-scanning engines. In step 610, the filter 136 determines whether the message is infected with a virus or contains any malicious code. If a message does not contain any virus or other malicious code, the virus filter 136 ends the process in step 606 and provides a link to the message to the spam filter 138. If a message is infected, the virus filter 136 proceeds to step 612 and determines whether the virus can be removed and the message repaired. If the message cannot be repaired using one of the virus engines, the virus filter 136 proceeds to step 614 and rejects the message. If the virus filter 136 rejects a message, it will return the message back to its sender with an indication that the message could not be delivered. An indication may also be sent to the intended recipient. If the virus filter 136 rejects a message, the message switch 122 does not perform any additional filtering of the message (i.e., the remaining filters are bypassed). If the message is repairable, the virus filter 136 proceeds to step 616 and repairs the message using one of the virus engines. During this step, the virus filter 136 may also notify the sender and recipient that the message contained a virus and was repaired. After step 616, the virus filter 136 ends at step 606 and provides a link to the message to spam filter 138.

Figure 7:
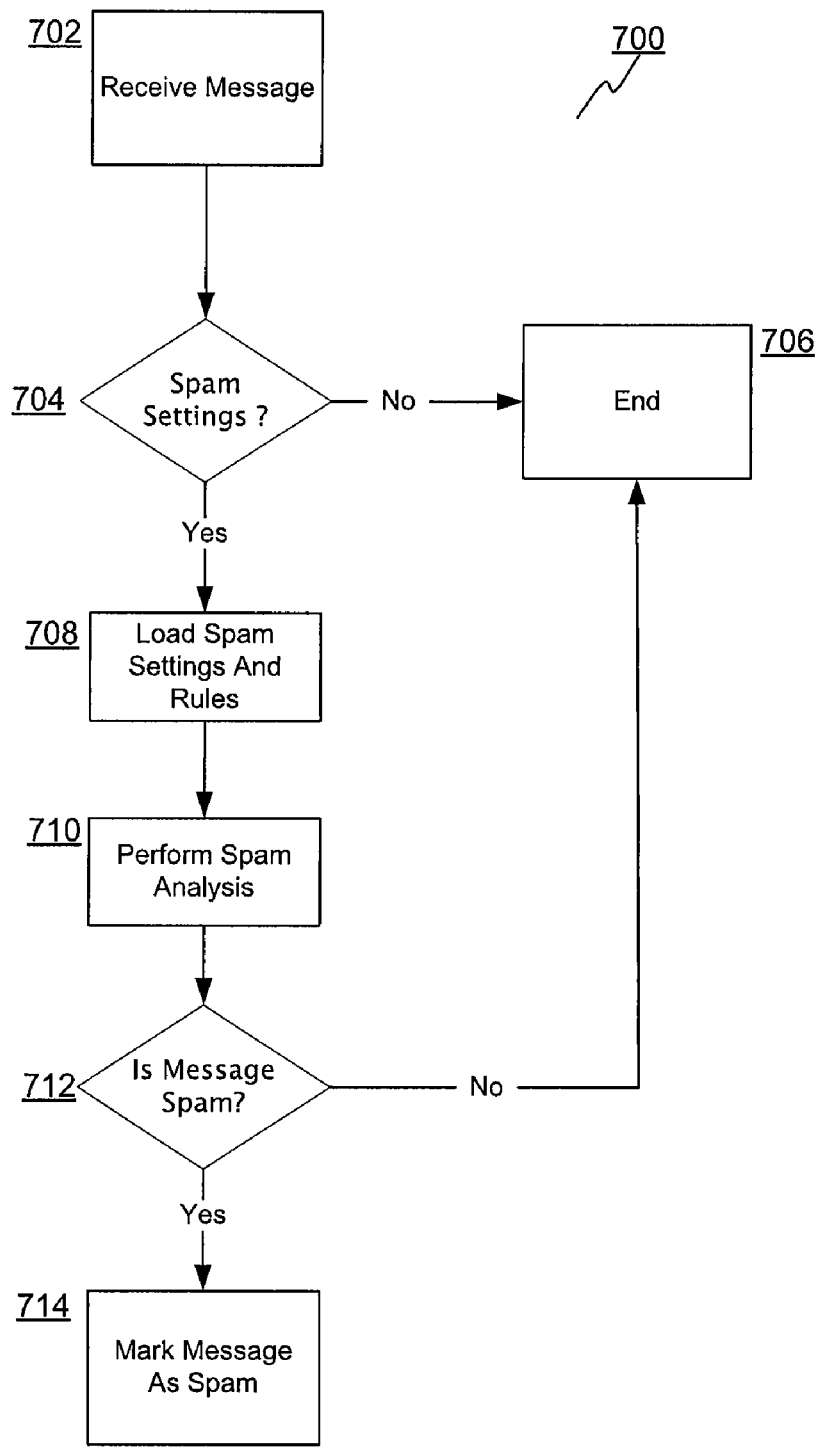
FIG. 7 is a flow diagram illustrating a method used by spam filter of the message switch to process messages according to spam type rules.

The spam filter 138 is communicatively coupled to the virus filter 136 and to the SMTP module 146. The spam filter 138 receives links to messages that have passed through the virus filter 136 in a queue. As soon as the spam filter 138 detects a link in its queue, it selects the corresponding message for processing. In one embodiment, the spam filter 138 only processes incoming messages. FIG. 7 illustrates an example of a method 700 that the spam filter 138 performs to process incoming messages. In alternate embodiments, the spam filter 138 may perform these steps in any order and may include additional or fewer steps. In step 702, the spam filter 136 receives a message and determines the inbound/outbound status of message. In step 704, the filter 138 determines whether any spam settings have been selected or enabled for the pertinent domain (e.g., the incoming domain) in the database 144. If no spam settings have been selected by the associated client, the spam filter 138 ends the process in step 706. This may include communicating with the SMTP delivery module 146 indicating that the message is ready for delivery. In step 504, the spam filter 138 may also review the MsgInfo file 142 to determine whether the message has failed a previous filter or whether an accept rule applies the message. If the message has failed a previous filter or an accept rule applies, the message will bypass the filter and the process ends in step 706. Global spam rules may be cached at the beginning of processing, and at various predetermined update times. In step 708, the spam filter 138 may download client-specific spam settings and rules. The database 144 contains rules that are used to determine whether an e-mail message is spam. Each rule within the database is assigned a unique identification (ID) number and a "point score", which may represent a weight or point value given to the rule for determining whether a message that matches the rule is spam. The rules may include, inter alia, rules regarding the originating IP address of e-mail messages, rules regarding the body of e-mail messages, and rules regarding the subject headings of e-mail messages. The database 144 may also include other rules and related attributes/statistics, such as those described in pending U.S. patent application Ser. No. 10/690,422 of Pettigrew et al. (the '422 application), which is assigned to the present assignee and incorporated herein by reference. In step 710, the spam filter 138 compares the rules to the message to determine whether the message is spam. More particularly, for each e-mail message, the spam filter 138 compares portions of the message, such as the subject heading, from heading and body, to rules and settings downloaded from the database 144. The spam filter calculates a total spam score for each message. Particularly, when a message matches a rule, the point score associated with the rule is added or subtracted from the message's total spam score. A score threshold for each message may be defined in the spam filter 138. The score for a message is compared to this threshold to determine whether the message is spam in step 712. When a message accumulates points greater than the threshold, the spam filter 138 marks it as spam in step 714. If the message's score is below the threshold, the spam filter 138 treats it as legitimate mail and proceeds to step 706. Therefore, the higher the point value associated with a rule, the more likely that a message matching the rule will be determined to be spam. The spam filter 138 may transfer legitimate mail to the SMTP delivery module 146 for delivery to the intended recipient or client 114 by postfix module 126. The spam filter 138 will mark other messages as spam and/or divert them to process 124 for delivery to another location, such as a Spam Shark™ mailbox or a quarantine area.

Thus, the present invention provides an integrated solution for e-mail processing to enforce content and policy rules and to prevent spam and viruses. The message switch 122 provides the integrated solution in a dynamically configurable arrangement of filters, which can adapt to current conditions to maximize processing efficiency.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. A system for processing e-mail messages for a plurality of clients, comprising:

a database for storing rules and settings for the plurality of clients, including policy rules, content rules and spam rules;

a message switch that includes a policy filter, a content filter, and a spam filter, where the message switch receives the e-mail messages in-transit and for each e-mail message of some plurality of the e-mail messages, before delivering the message, the message switch: loads rules and settings which are from the database, where the rules and settings are selected based on their correspondence to a client that is either a sender or recipient of the message, and the policy filter, content filter and spam filter filter the e-mail message according to the policy rules, content rules, and spam rules, respectively; and whereby the rules that are applied to e-mail messages depends on the corresponding clients sending or receiving the e-mail messages, wherein a message is processed by the filters in a particular filter order, and wherein the message switch is dynamically configurable such that the particular filter order changes to adapt to current conditions.

2. The system of claim 1 wherein the message switch further includes a virus filter that filters messages for malicious code.

3. The system of claim 2 wherein each of the filters may be selectively enabled and disabled by a client and wherein the settings include an identification of the filters enabled by a particular client.

4. The system of claim 1 wherein the policy and content filters reject messages that violate corresponding rules.

5. The system of claim 1 wherein the policy and content filters quarantine messages that violate corresponding rules.

6. The system of claim 1 wherein the message switch ends processing of a message when it fails any of the filters.

7. The system of claim 1 wherein e-mail conditions are automatically monitored and the message switch automatically changes the particular filter order based on changes in the current e-mail conditions.

8. The system of claim 1 wherein the particular filter order is manually changeable by an operator.

9. The system of claim 1 wherein the policy filter compares the message to one or more accept rules, and if an accept rule is matched, the policy filter causes the message to bypass one or more filters in the message switch.

10. The system of claim 1 wherein the message switch stores a message in a first location when the message is received and creates links to various portions of the message, and wherein each of the filters receives and processes the message by use of the links.

11. The system of claim 1 wherein the system is implemented over a distributed network having a plurality of mail servers, where each includes a message switch.

12. The system of claim 1 wherein the message switch stores information regarding each message in an information file.

13. A system for processing e-mail messages in transit between various sending clients and various intended recipient clients comprising:

a policy filter that loads policy rules for a message from a database, where the policy rules loaded are selected to be loaded based on a client associated with the message such that the policy rules loaded for different messages vary according to their respective clients, the policy filter also compares the message to the policy rules, and blocks the message from being delivered if a policy rule is violated;

a content filter that loads content rules for a message from the database, where the content rules loaded are selected to be loaded based on a client associated with the message such the content rules loaded for different messages vary according to their respective clients, the content filter also compares the message to the content rules, and blocks the message if a content rule is violated;

a virus filter that detects malicious code and blocks the message if malicious code is detected; and a spam filter that loads spam rules for a message from the database, the spam rules loaded are selected to be loaded based on the client associated with the message such the spam rules loaded for different messages vary with different clients, the spam filter also determines whether the message is spam based on the rules, and accordingly blocks the message; and wherein the filters process the messages in an order which is dynamically reconfigurable based on current conditions, and where each filter has lower precedent than any earlier filter(s) in the order such that if an earlier filter determines from one of its rules that a message should be accepted then that message bypasses any later filter(s), or if an earlier filter determines from one of its rules that a message should be blocked then that message is blocked without being passed to any later filter(s).

14. The system of claim 13 wherein the order is automatically changed by the system.

15. The system of claim 13 wherein the order is manually changed by a system operator.

16. The system of claim 13 wherein the system further comprises: a message delivery module that delivers a message to an intended recipient if the message has not been blocked.

17. The system of claim 16 further comprising: a quarantine area for storing blocked messages.

18. The system of claim 16 wherein the delivery module returns blocked messages to respective senders.

19. A method for processing e-mail messages in transit between sending clients and intended recipient clients, the method comprising:

providing a first filter, a second filter, and a third filter, where each filter has a corresponding incoming message queue where messages are queued until being processed by the corresponding filter, the filters forming a pipeline where messages are passed, via the queues, form one filter to the next;

receiving e-mail messages for processing;

processing the e-mail messages through the filters in a filter-order by queuing the messages into the message queue of the filter that is first in the filter-order, and subsequent filters process the e-mail messages and pass them to the next filter's queue, where each filter determines whether to block or pass any e-mail messages that it processes, wherein at least one of the filters selects rules from among a set of rules based on a sender or recipient of the e-mail message and applies the selected rules to the e-mail message;

automatically monitoring current e-mail conditions while some of the e-mail messages are being received; and automatically and dynamically modifying the filter-order based on the current e-mail conditions.

20. The method of claim 19, further comprising: selecting rules and settings for each of the filters to process an e-mail message, where the rules and settings are pre-associated with different domains of the senders or recipients and the rules for a filter to process an e-mail message are selected for that filter based on their pre-association with a domain of the message.

21. The method of claim 20 further comprising: selectively enabling and disabling one or more of the filters, based on a domain associated with the message.

22. The method of claim 19 wherein the first filter comprises a policy filter that compares the e-mail messages to client-based policy rules, and blocks the messages if a policy rule is violated.

23. The method of claim 22 wherein the second filter comprises a content filter that compares the e-mail messages to client-based content rules, and blocks the messages if a content rule is violated.

24. The method of claim 23 wherein the third filter comprises a spam filter that compares the e-mail messages to client-based spam rules, and blocks the messages if a spam rule is violated.

25. The method of claim 24 further comprising: providing a virus filter; and processing the e-mail messages through the virus filter.

26. The method of claim 19 further comprising: determining whether an e-mail message matches an accept rule; and causing the e-mail message to bypass one or more of the filters if the e-mail message matches an accept rule.

27. The method of claim 19 further comprising: ending processing of an e-mail message if the e-mail message fails any of the filters.

28. A computer readable medium storing information to enable a device to perform a process to operate as a message switch for filtering e-mails, the process comprising:

receiving e-mails in transit between sending and intended recipient clients;

accessing a set of stored rules that are selectively applied to the e-mails based on senders or intended recipients of the e-mails to determine whether or not to deliver the e-mails; and executing a plurality of e-mail filters that are arranged to filter e-mails by applying varying subsets of the rules to the e-mails, where the e-mail filters filter a given e-mail in an order, one e-mail filter after another, and the order changes dynamically while some of the e-mails are being received by the message switch, the order of the e-mail filters determining relative precedence of the e-mail filters for filtering an e-mail, wherein e-mails that do not pass a filter are not delivered, and wherein when the order changes the relative precedence of the e-mail filters changes; and selecting at least some of the rules comprising a subset of the rules that are applied by a given e-mail filter to a given e-mail, where the rules of the subset are selected based on a sender or intended recipient of the e-mail such that which of the rules in set of stored rules will be applied to the e-mail depends on the sender or intended recipient of the e-mail.

29. A computer readable medium according to claim 28, wherein the selecting at least some of the rules comprises selecting rules according to pre-association of the rules with a domain of the sender or intended recipient of the e-mail.

30. A computer readable medium according to claim 28, wherein each e-mail filter has an e-mail queue from which it receives e-mails to apply rules to the e-mails, and when an e-mail filter is done applying rules to an e-mail and the e-mail is not rejected by the e-mail filter, the e-mail enters the queue of the next filter.

31. A computer readable medium according to claim 28, wherein, for at least some of the received e-mails, rules therefor are default rules that are not selected based on the sending or intended recipient client.

32. A computer readable medium according to claim 28, wherein each e-mail filter corresponds to a different category of rules.

33. A computer readable medium according to claim 32, wherein the categories comprise anti-virus rules, spam rules, and content rules.

* * * * *